(12) United States Patent
Li et al.

(10) Patent No.: US 12,127,170 B2
(45) Date of Patent: Oct. 22, 2024

(54) TRANSMISSION METHOD, TERMINAL DEVICE, AND NETWORK-SIDE DEVICE

(71) Applicant: VIVO MOBILE COMMUNICATION CO., LTD., Chang'an Dongguan (CN)

(72) Inventors: Can Li, Chang'an Dongguan (CN); Xiaodong Shen, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 520 days.

(21) Appl. No.: 17/488,977

(22) Filed: Sep. 29, 2021

(65) Prior Publication Data
US 2022/0022187 A1    Jan. 20, 2022

Related U.S. Application Data

(63) Continuation of application No. PCT/CN2020/081025, filed on Mar. 25, 2020.

(30) Foreign Application Priority Data

Mar. 29, 2019 (CN) .......................... 201910252553.9

(51) Int. Cl.
*H04W 72/0446* (2023.01)
*H04W 72/231* (2023.01)
(Continued)

(52) U.S. Cl.
CPC ..... *H04W 72/0446* (2013.01); *H04W 72/231* (2023.01); *H04W 74/08* (2013.01); *H04L 12/40176* (2013.01)

(58) Field of Classification Search
CPC .......... H04L 25/03012; H04L 27/2671; H04L 12/40176; H04W 72/0446; H04W 72/1294; H04W 72/231
See application file for complete search history.

(56) References Cited

U.S. PATENT DOCUMENTS

2018/0014255 A1    1/2018  Pelletier et al.
2018/0368160 A1   12/2018  Kunt et al.
(Continued)

FOREIGN PATENT DOCUMENTS

CN    108141869 A    6/2018
CN    108347307 A    7/2018
(Continued)

OTHER PUBLICATIONS

R1-1902988, "Enhancement to configured grants in NR unlicensed", Feb. 25-Mar. 1, 2019, pp. 1-9 (Year: 2019).*
(Continued)

*Primary Examiner* — Salvador E Rivas
(74) *Attorney, Agent, or Firm* — von Briesen & Roper, s.c.

(57) ABSTRACT

This disclosure provides a transmission method, a terminal device, and a network-side device. The method is applied to a terminal device and includes: receiving first indication information from a network-side device, where the first indication information is used to indicate a first resource usable for configured grant transmission within a configured grant resource period; and transmitting first to-be-transmitted data on the first resource for consecutively K times, where K is a positive integer.

18 Claims, 8 Drawing Sheets

---

Receive first indication information from a network-side device, where the first indication information is used to indicate a first resource usable for configured grant transmission within a configured grant resource period — 201

Transmit first to-be-transmitted data for consecutively K times on the first resource, where K is a positive integer — 202

(51) Int. Cl.
*H04W 74/08* (2009.01)
*H04L 12/40* (2006.01)

(56) References Cited

U.S. PATENT DOCUMENTS

| | | | |
|---|---|---|---|
| 2018/0368205 A1 | 12/2018 | Park et al. | |
| 2019/0075589 A1 | 3/2019 | Jeon et al. | |
| 2019/0159241 A1 | 5/2019 | Aiba et al. | |
| 2019/0223168 A1 | 7/2019 | Li et al. | |
| 2019/0230689 A1* | 7/2019 | Cao | H04L 27/2602 |
| 2019/0254061 A1* | 8/2019 | Manolakos | H04L 5/0051 |
| 2019/0254088 A1* | 8/2019 | Park | H04L 1/08 |
| 2019/0349145 A1 | 11/2019 | You | |
| 2020/0008229 A1 | 1/2020 | Li et al. | |
| 2020/0015212 A1 | 1/2020 | Lyu et al. | |
| 2021/0045076 A1* | 2/2021 | Tomeba | H04W 56/001 |
| 2021/0068084 A1 | 3/2021 | Zhao | |
| 2021/0377972 A1 | 12/2021 | Zhu | |

FOREIGN PATENT DOCUMENTS

| | | |
|---|---|---|
| CN | 108513732 A | 9/2018 |
| CN | 108633020 A | 10/2018 |
| CN | 109120380 A | 1/2019 |
| CN | 109314969 A | 2/2019 |
| CN | 109417516 A | 3/2019 |
| WO | 2018059389 A1 | 4/2018 |
| WO | 2018166447 A1 | 9/2018 |

OTHER PUBLICATIONS

R1-1901612, "Discussion on configured grants for NR-U", Feb. 25-Mar. 1, 2019, pp. 1-6 (Year: 2019).*
Korean Office Action for related Application No. 10-2021-7035430; reported on Dec. 21, 2023.
Ericsson, "Configured UL grant for NR-U", Feb. 25-Mar. 1, 2019, 3GPP TSG RAN WG1 Meeting #96, 7.2.2.2.4, Athens, Greece, R1-1902886.
VIVO. "Discussion on the Configurations of Configured Grant in NR-U". Feb. 25-Mar. 1, 2019, 3GPP TSG-RAN WG2 Meeting #105, 11.2.1.2, Athens, Greece, R2-1900235.
Chinese Office Action related to Application No. 201910252553.9 reported on Jan. 4, 2022.
International Search Report & Written Opinion related to Application No. PCT/CN2020/081025; reported on Jun. 30, 2020,.
R1-1901612—Source: ZTE, Sanechips "Discussion on Configured Grant for NR-U", Agenda item: 7.2.2.2.4, Document for: Discussion and Decision, 3GPP TSG RAN WG1 #96, Athens, Greece, Feb. 25-Mar. 1, 2019.
R1-1903409—Source: Vivo "Feature Lead Summary for Configured Grant Enhancement", Agenda item: 7.2.2.2.4, Document for: Discussion and Decision, 3GPP TSG RAN WG1 #96, Athens, Greece, Feb. 25-Mar. 1, 2019.
R1-1904068—Source: Vivo "Discussion on the Enhancements to Configured Grants", Agenda item: 7.2.2.2.4, Document for: Discussion and Decision, 3GPP TSG RAN WG1 Meeting #96bis, Xi'an, China, Apr. 8-12, 2019.
R1-1906133—Source: Vivo "Discussion on the Enhancements to Configured Grants", Agenda item: 7.2.2.2.4, Document for: Discussion and Decision, 3GPP TSG RAN WG1 #97, Reno, USA, May 13-17, 2019.
R1-1912015—Source: Vivo "Discussion on the Enhancements to Configured Grants", Agenda item: 7.2.2.2.4, Document for: Discussion and Decision, 3GPP TSG RAN WG1 #99, Reno, USA, Nov. 18-22, 2019.
"Resource Allocation for Uplink Grant-Free Ultra-Reliable and Low Latency Communications" Inventor: Zhiyi Zhou et al.
Second Chinese Office Action related to Application No. 201910252553.9 reported on Jun. 14, 2022.
Extended European Search Report related to Application No. 20784963.9 reported on Apr. 25, 2022.
R1-1812197—Source: Huawei, HiSilicon "Transmission with configured grant in NR unlicensed band", Agenda Item: 7.2.2,4.4, Document for: Discussion and decision, 3GPP TSG RAN WG1 Meeting #95, Spokane, USA, Nov. 12-Nov. 16, 2018.
R1-1812691—Source: Nokia, Nokia Shanghai Bell "On support of UL transmission with configured grants in NR-U", Agenda Item: 7.2.2.4.4, Document for: Discussion and Decision, 3GPP TSG RAN WG1 Meeting #95, Spokane, USA, Nov. 12-16, 2018.
R1-1903341—Source: NTT DOCOMO, Inc. "Summary of 7.2.6.3 Enhanced configured grant PUSCH transmissions", Agenda item: 7.2.6.3, Document for: Discussion and decision, 3GPP TSG RAN WG1 Meeting #96, Athens, Greece, Feb. 25-Mar. 1, 2019.
R2-1816264—Source: OPPO, "Enhancements of configured grant in NR-U", Agenda item: 11.2.1.2, Document for: Discussion, Decision, 3GPP TSG-RAN WG2 Meeting #104, Spokane, USA, Nov. 12-16, 2018.
South Korean Request for the Submission of an Opinion for related Application No. 10-2021-7035430; reported on Jun. 9, 2023.
Huawei, Hisilicon, "Transmission with configured grant in NR unlicensed band", Feb. 25-Mar. 1, 2019, 3GPP TSG RAN WG1 Meeting #96, Athens, Greece, R1-1901528.

* cited by examiner

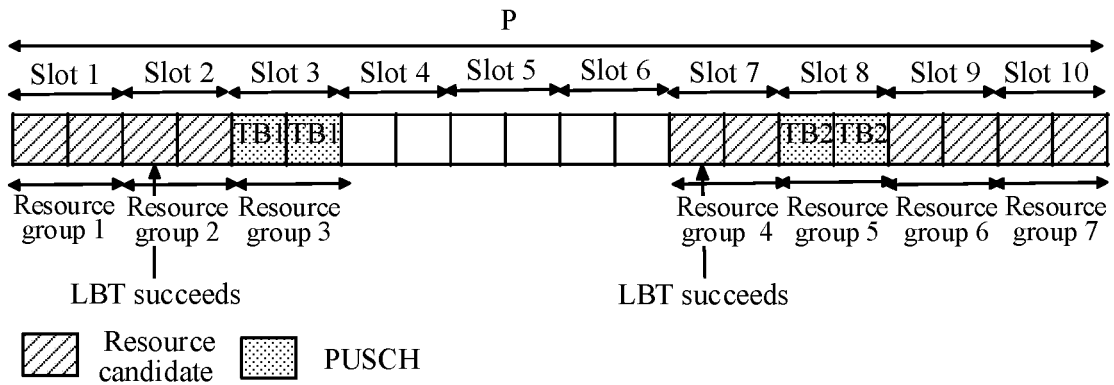
FIG. 6d
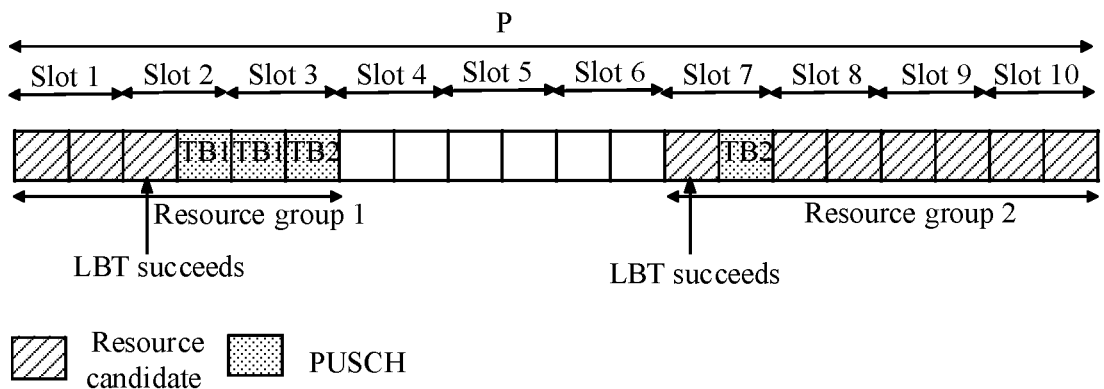
FIG. 6e
Transmit first indication information to a terminal device, where the first indication information is used to indicate a first resource usable for configured grant transmission within a configured grant resource period — 701
FIG. 7

TRANSMISSION METHOD, TERMINAL DEVICE, AND NETWORK-SIDE DEVICE

CROSS-REFERENCE TO RELATED APPLICATIONS

This application is a continuation application of PCT Application No. PCT/CN2020/081025 filed on Mar. 25, 2020, which claims priority to Chinese Patent Application No. 201910252553.9, filed in China on Mar. 29, 2019, disclosures of which are incorporated herein by reference in their entireties.

TECHNICAL FIELD

Embodiments of this disclosure relate to the field of communications technologies, and in particular, to a transmission method, a terminal device, and a network-side device.

BACKGROUND

With the rapid growth of data services, data transmission burden on carriers of licensed spectrums is also increasing. Therefore, using carriers of unlicensed spectrums to share the burden of data traffic on the carriers of licensed spectrums has become an important evolving direction in the development of later communications systems.

However, flexibility of resource configuration on an unlicensed spectrum in the related art is low.

SUMMARY

According to a first aspect, an embodiment of this disclosure provides a transmission method applied to a terminal device, where the method includes:

receiving first indication information from a network-side device, where the first indication information is used to indicate a first resource usable for configured grant transmission within a configured grant resource period; and transmitting first to-be-transmitted data on the first resource for consecutively K times, where K is a positive integer.

According to a second aspect, an embodiment of this disclosure further provides a transmission method applied to a network-side device, where the method includes:

transmitting first indication information to a terminal device, where the first indication information is used to indicate a first resource usable for configured grant transmission within a configured grant resource period.

According to a third aspect, an embodiment of this disclosure further provides a terminal device, where the terminal device includes:

a receiving module, configured to receive first indication information from a network-side device, where the first indication information is used to indicate a first resource usable for configured grant transmission within a configured grant resource period; and a first transmission module, configured to transmit first to-be-transmitted data on the first resource for consecutively K times, where K is a positive integer.

According to a fourth aspect, an embodiment of this disclosure further provides a network-side device, where the network-side device includes:

a transmitting module, configured to transmit first indication information to a terminal device, where the first indication information is used to indicate a first resource usable for configured grant transmission within a configured grant resource period.

According to a fifth aspect, an embodiment of this disclosure further provides a terminal device, where the terminal device includes a processor, a memory, and a computer program stored in the memory and capable of running on the processor, and when the computer program is executed by the processor, the steps of the foregoing transmission method applied to the terminal device are implemented.

According to a sixth aspect, an embodiment of this disclosure further provides a network-side device, where the network-side device includes a processor, a memory, and a computer program stored in the memory and capable of running on the processor, and when the computer program is executed by the processor, the steps of the foregoing transmission method applied to the network-side device are implemented.

According to a seventh aspect, an embodiment of this disclosure further provides a computer-readable storage medium, where the computer-readable storage medium stores a computer program, and when the computer program is executed by a processor, the steps of the foregoing transmission method applied to the terminal device or the steps of the foregoing transmission method applied to the network-side device are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings without creative efforts.

FIG. 6d is a third schematic diagram of transmission of to-be-transmitted data according to an embodiment of this disclosure;

FIG. 6e is a fourth schematic diagram of transmission of to-be-transmitted data according to an embodiment of this disclosure;

FIG. 7 is a second flowchart of a transmission method according to an embodiment of this disclosure;

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Figure 1:
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network-side device 12, and communication can be performed between the terminal 11 and the network-side device 12.

In this embodiment of this disclosure, the terminal 11 may also be referred to as user equipment (UE). In actual implementation, the terminal 11 may be a terminal-side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in the embodiments of this disclosure.

The network-side device 12 may be a base station, a relay, an access point, or the like. It should be noted that a specific type of the network-side device 12 is not limited in the embodiments of this disclosure.

For ease of understanding, the following describes some content involved in the embodiments of this disclosure:

I. Clear Channel Assessment

In a $5^{th}$ generation (5G) communications system, a terminal or network-side device needs to perform listen before talk (LBT) before transmitting information in a new radio (NR) unlicensed band. To be specific, the terminal or network-side device needs to perform clear channel assessment (CCA) or extended clear channel assessment (eCCA) for channel monitoring, that is, to perform energy detection (ED) on a channel. Data cannot be transmitted until a channel is determined to be idle when energy of the channel is lower than a specified threshold. Because an unlicensed band is shared by a plurality of technologies or transmission nodes, such contention-based access mode causes uncertainty about when a channel is available. It is clearly defined in the related art that three LBT categories can be used in 5G unlicensed communications systems:

LBT category (Cat) 1: Direct transmission is performed without any CCA. LBT Cat 1 can be used only in a case that a channel has been obtained and that a transmission switching gap is less than 16 µs.

LBT Cat 2: Channel listening is performed for 25 us, and LBT Cat 2 can be used for obtaining a channel for a specific signal, with a maximum continuous transmission duration less than a specified value, such as 1 ms.

LBT Cat 4: Channel listening with random backoff is performed, where a maximum transmission duration after a channel is obtained varies with priority parameter settings.

II. Autonomous Uplink Access (AUL) Time-Domain Resource Configuration for $4^{th}$-Generation (4G) Unlicensed Communications Systems In future enhanced licensed assisted access (FeLAA) in R15, a base station configures radio resource control (RRC) by using an AUL-subframe field. This field contains 40 bits, which indicate subframes usable for AUL transmission in a bitmap mode. The first bit in this field corresponds to subframe #0 of a radio frame that satisfies a system frame number (SFN) mod 4=0. '0' in the bitmap indicates a corresponding subframe usable for AUL transmission, and '1' indicates a corresponding subframe usable for AUL transmission.

III. Time-Domain Resource Configuration for 5G Licensed Communications Systems

A configured grant transmission mode may be used for physical uplink shared channel (PUSCH) transmission in a 5G licensed communications system, and there are two types of resource configurations: Type 1 and Type 2. For Type 1, semi-static configuration (including a configuration period, a slot offset, PUSCH start and length indicator values (SLIV), and the number K of repetitions) is done by using RRC, without detection for downlink control information (DCI). Resource configuration periods of configured grants for NR in R15 vary with subcarrier spacings, as shown in Table 1 with kilohertz (kHz), normal cyclic prefix (Normal CP), and extended cyclic prefix (ECP).

TABLE 1

Table of mapping between configured grant
resource configuration periods and subcarrier spacings

| Subcarrier spacing | Configured grant resource configuration periods |
| --- | --- |
| 15 kHz | 2, 7, n × 14, where a value of n may be any one in {1, 2, 4, 5, 8, 10, 16, 20, 32, 40, 64, 80, 128, 160, 320, 640} |
| 30 kHz | 2, 7, n × 14, where a value of n may be any one in {1, 2, 4, 5, 8, 10, 16, 20, 32, 40, 64, 80, 128, 160, 256, 320, 640, 1280} |
| 60 kHz (normal cyclic prefix) | 2, 7, n × 14, where a value of n may be any one in {1, 2, 4, 5, 8, 10, 16, 20, 32, 40, 64, 80, 128, 160, 256, 320, 512, 640, 1280, 2560} |
| 60 kHz (extended cyclic prefix) | 2, 6, n × 12, where a value of n may be any one in {1, 2, 4, 5, 8, 10, 16, 20, 32, 40, 64, 80, 128, 160, 256, 320, 512, 640, 1280, 2560} |
| 120 kHz | 2, 7, n × 14, where a value of n may be any one in {1, 2, 4, 5, 8, 10, 16, 20, 32, 40, 64, 80, 128, 160, 256, 320, 512, 640, 1024, 1280, 2560, 5120} |

For Type 2, after configuration (including a configuration period and the number K of recharges) is done by using RRC, UE is scheduled by detecting information of activated DCI (including slot offset and PUSCH SLIV).

It should be noted that the standards stipulate that UE cannot configure a period for K repetitions longer than a configuration period P. In addition, when K>1, the UE should repeatedly transmit a TB spanning K consecutive slots and apply the same symbols in each slot.

IV. Configured Grant Resource Configuration for 5G Unlicensed Communications Systems In the standard discussion of 5G unlicensed communications systems, there are two options for time-domain resources based on configured grant transmission in the related art:

1. enhancement based on a periodic configuration of configured grants for NR in R15; and
2. enhancement based on AUL bitmap configuration in FeLAA.

To enhance flexibility of resource configuration in time domain, smaller-granularity resource allocation and multiple resource configurations within a period can be considered.

If an enhancement scheme based on AUL bitmap configuration in FeLAA is supported for time-domain resources based on configured grant transmission in a 5G unlicensed communications system, there will be corresponding problems depending on the following cases:

Case 1-1: If the configuration in the AUL is reused, each bit represents a subframe, and constant 40 bits are used for bitmap. If the period P configured for the bitmap must satisfy that the number of bits in the bitmap is divisible by P, flexibility of the period configuration is reduced. In addition, for carriers with a large subcarrier spacing, there are two or four or more slots in each subframe, which reduces flexibility of resource configuration granularity.

Case 1-2: If each bit represents a slot, there are the following two cases:

Case 1-2a: Bitmaps with different subcarrier spacings are configured with a same period. In the same time period, the number of bits corresponding to 15 kHz is X, the number of bits corresponding to 30 kHz is 2×, and the number of bits corresponding to 60 kHz is 4×.

Case 1-2b: Bitmaps with different subcarrier spacings are configured with different periods, and the period is a constant number, X slots. In this case, UE needs to monitor new bitmaps on different subcarrier spacings (SCS) in different configuration periods. This increases energy consumption of the UE.

Moreover, neither of the above two cases can implement scheduling with smaller granularity, for example mini-slots. If each bit represents one mini-slot, this in turn implies more bits and more overheads.

If an enhancement scheme based on a periodic configuration of configured grants for NR in R15 is supported for time-domain resources based on configured grant transmission in a 5G unlicensed communications system, there will be corresponding problems depending on the following cases:

Case 2-1: To enhance the flexibility of resource configuration, the value of K is reinterpreted as the number of configured resources in the configured period, and a plurality of configured resources are consecutive in time domain. However, the field for K repetitions has only-2-bit signaling, meaning that it can indicate only four configured resources at most, which cannot meet the resource configuration requirements in more cases. Although in NR-U, UE can add a hybrid automatic repeat request (HARQ) process ID and a redundancy version (RV) into UCI, if the base station does not indicate K repetitions, the UE autonomously initiates K' repetitions; and if the base station fails to demodulate UCI content for K' times, this may result in failure to successfully demodulate a PUSCH. Furthermore, because receiver algorithms for different base stations are different, different K values can be configured to match different receiver algorithms, so as to increase a success ratio of data demodulation. Therefore, it is considered that configuring K repetitions by a base station can better ensure high reliability of URLLC service data.

Case 2-2: Adding a bitmap field to indicate availability of configured grant resources that have been configured If each bit represents one slot, case 1-2 still needs to be considered. If each bit can represent a plurality of slots, such as one subframe, case 1-1 needs to be considered. Besides, the scheme does not consider how to do K repetitions on non-consecutive resources.

The following describes the transmission method in the embodiments of this disclosure.

Figure 2:
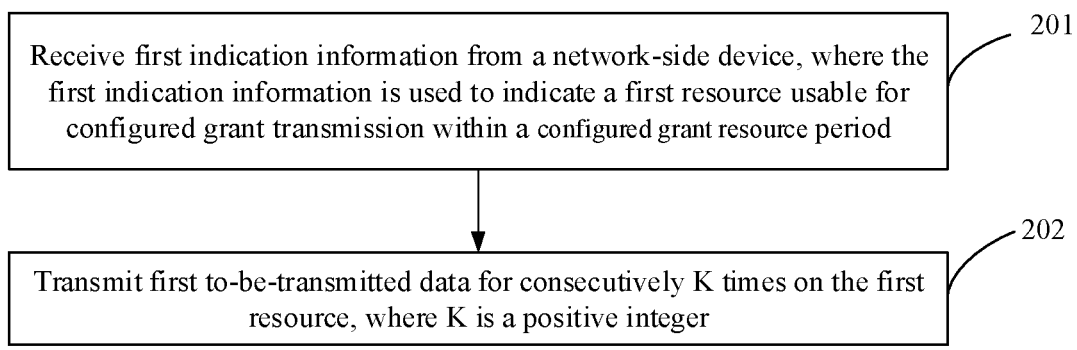
FIG. 2 is a first flowchart of a transmission method according to an embodiment of this disclosure.

FIG. 2 is a first flowchart of a transmission method according to an embodiment of this disclosure. The transmission method shown in FIG. 2 may be applied to a terminal device.

As shown in FIG. 2, the transmission method includes the following steps:

Step 201: Receive first indication information from a network-side device, where the first indication information is used to indicate a first resource usable for configured grant transmission within a configured grant resource period.

In practical applications, the first indication information may be carried in radio resource control (RRC) signaling, but is not limited thereto. The resource configuration period may be configured by the network-side device by using RRC. Optionally, a resource configuration period is a configuration period for which a configured grant in an NR licensed spectrum may be reused, but is not limited thereto.

In specific implementation, optionally, the first indication information may indicate the first resource in a field indication mode or a bitmap indication mode. However, it should be understood that this embodiment of this disclosure does not therefore limit the mode in which the first indication information indicates the first resource.

It should be understood that specific representations of the first resource may vary with different modes in which the first indication information indicates the first resource, with specific descriptions as follows.

Optionally, in a case that the first indication information indicates the first resource in a field indication mode, the first resource may be:

one resource; or

M consecutive resources, where M is an integer greater than 1; or

S resource groups, where each resource group includes K consecutive resources, and S is a positive integer.

In an implementation, the S resource groups may be S consecutive resource groups. In another implementation, the S resource groups may alternatively include at least two non-consecutive resource groups.

Optionally, in a case that the first indication information indicates the first resource in a bitmap indication mode, the first resource is:

Q resource groups divided based on virtual consecutive time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

During implementation, the bitmap may use a value of a bit to indicate whether a resource corresponding to the bit is a resource usable for configured grant transmission. Specifically, if the value of the bit is a first value, it means that the resource indicated by the bit is usable for configured grant transmission; if the value of the bit is a second value, it means that the resource indicated by the bit is unusable for configured grant transmission; where the first value and the second value are not equal. For example, if a value of a bit is "1", it means that a resource indicated by the bit is usable for configured grant transmission; if a value of a bit is "0", it means that a resource indicated by the bit is unusable for configured grant transmission. For ease of description, the following description is based on the first value being "1" and the second value being "0", but this disclosure does not limit the specific values of the first value and the second value.

In addition, a resource granularity indicated by each of bits in the bitmap may be configured by using RRC. In specific implementation, the resource granularities may be represented in: subframe, slot, min-slot, and the like. A resource granularity indicated by each bit may be determined depending on an actual situation.

The number of bits in the bitmap may be configured by using RRC or set to a constant value. Each bit may correspond to one or more resources.

It should be understood that, in actual application, bits in a bitmap that are used to indicate resources usable for configured grant transmission may be consecutive or non-consecutive. For example, assuming that a bitmap includes 6 bits, values of the 6 bits may be 011110 or 011011.

In this embodiment of this disclosure, in a case that the bits in the bitmap that are used to indicate the resources usable for configured grant transmission are non-consecutive, the first resource indicated by the bitmap may be determined by using at least the following two methods.

Method 1: The terminal maps resources usable for configured grant transmission to virtual consecutive time-domain resources; divides the virtual consecutive time-domain resources into Q resource groups, with each resource group including K virtual consecutive resources; and determines the Q resource groups as the first resource.

Figure 3A:
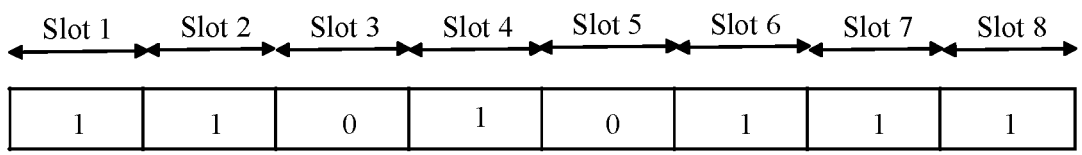
FIG. 3*a* is a first schematic diagram of a bitmap according to an embodiment of this disclosure.
Figure 3B:
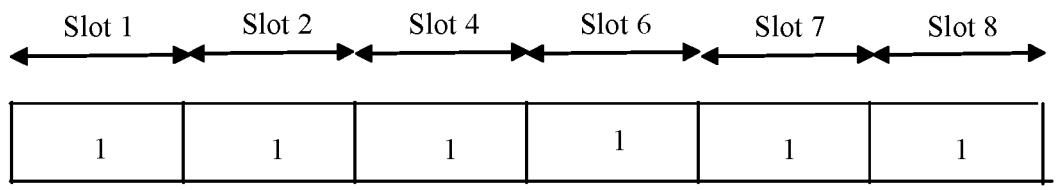
FIG. 3*b* is a first schematic diagram of virtual consecutive time-domain resources according to an embodiment of this disclosure.
Figure 3C:
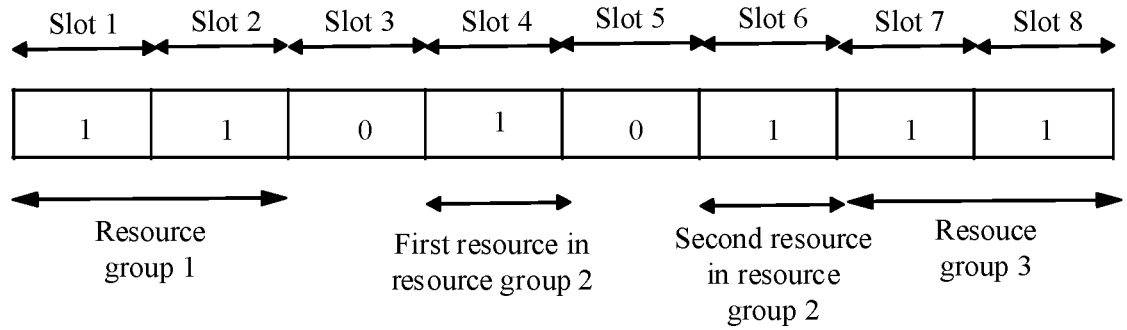
FIG. 3*c* is a first schematic diagram of resource configuration according to an embodiment of this disclosure.

For ease of understanding, refer to FIG. 3a to FIG. 3c together. In FIG. 3a, the bitmap includes eight bits, and values of the eight bits are 11010111 from left to right in sequence. The terminal may map resources respectively corresponding to bit 1, bit 2, bit 4, bit 6, bit 7, and bit 8 to virtual consecutive time-domain resources as shown in FIG. 3b. Further, if K is 2, the terminal may divide, based on the virtual consecutive time-domain resources in FIG. 3b, resources corresponding to bit 1 and bit 2 into resource group 1, resources corresponding to bit 4 and bit 6 into resource group 2, and resources corresponding to bit 7 and bit 8 into resource group 3, as shown in FIG. 3c. In this scenario, the first resource includes the resource group 1 and the resource group 2.

Method 2: According to indication results of the bitmap, the resources usable for configured grant transmission are divided into T resource groups, resources in different resource groups are non-consecutive in the bitmap, and T resource groups are determined as the first resource.

In addition, in this method, in a case that the number of resources included in the resource group is greater than 1, the resources in the resource group are consecutive in the bitmap.

Figure 3D:
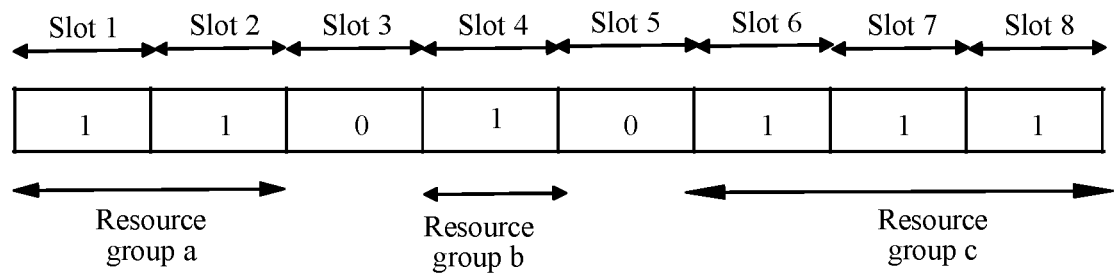
FIG. 3*d* is a second schematic diagram of resource configuration according to an embodiment of this disclosure.

For ease of understanding, the bitmap shown in FIG. 3a is still used as an example for description. In this method, the terminal may directly divide resources corresponding to bit 1 and bit 2 into resource group a, a resource corresponding to bit 4 into resource group b, and resources corresponding to bit 6, bit 7, and bit 8 into resource group c, as shown in FIG. 3d. In this scenario, the first resource includes resource group a, resource group b, and resource group c.

Compared with Method 1, in Method 2, the resources usable for configured grant transmission may be directly divided into T resource groups according to the indication results of the bitmap, without mapping the resources usable for configured grant transmission in the bitmap to the virtual consecutive time-domain resources, which can improve efficiency of determining the first resource.

Compared with Method 2, each resource group in the first resource determined in Method 1 includes K virtual consecutive resources, which can improve reliability of data transmission.

Step 202: Transmit first to-be-transmitted data on the first resource for consecutively K times, where K is a positive integer.

In this embodiment of this disclosure, the to-be-transmitted data can be understood as data to be transmitted by the terminal device, for example, a transport block (TB), but is not limited thereto. K may be understood as the number of repetitions, K may be configured by the network-side device by using RRC, but the method of determining K is not limited thereto.

It can be learned from the foregoing that the terminal needs to perform a LBT process before transmitting data in an unlicensed frequency band, and after LBT succeeds, the terminal transmits the data in the unlicensed frequency band.

Further, in this embodiment of this disclosure, a time position at which the terminal transmits the data is associated with a time position at which LBT succeeds.

Optionally, the transmitting first to-be-transmitted data on the first resource for consecutively K times includes:

if the terminal device succeeds in listen before talk LBT after a first time position and before a second time position, or the terminal device succeeds in LBT at a second time position, transmitting the first to-be-transmitted data for consecutively K times starting at the second time position; where the first time position and the second time position are two adjacent time positions in target time positions; and the target time positions are time positions that are determined based on the first resource and that are usable for starting transmitting the to-be-transmitted data for consecutively K times.

In addition, it should be noted that, considering that the terminal may perform LBT process on resources other than the resources usable for configured grant transmission, if the terminal device succeeds in LBT before a first target time position in the target time positions, or succeeds in LBT at a first target time position, the terminal may transmit the first to-be-transmitted data for consecutively K times starting at the first target time position, where the first target time position is ahead of other target time positions in the target time positions in time domain.

In this embodiment of this disclosure, the first indication information is used to indicate the first resource usable for configured grant transmission within a configured grant resource period, but a specific location of the first resource in the resource configuration period needs to be determined based on other resource configuration parameters such as start and length indicator values (SLIV) and a slot offset.

SLIV may indicate a start time position S of the first resource in the resource configuration period, and a length L of each resource in the first resource. It should be understood that S and L indicated by SLIV can ensure that a transmission resource corresponding to each piece of to-be-transmitted data does not span a slot boundary, to be specific, it can ensure that each piece of to-be-transmitted data is transmitted in each slot. In addition, SLIV may be configured by using RRC or indicated by using DCI.

In this embodiment of this disclosure, for first resources in different representations, target time positions determined based on the first resources may be different, which is described in detail as follows.

Embodiment 1: In a case that the first resource is M consecutive resources, the target time positions include: a start time position of each resource.

It should be understood that each resource is each of the M consecutive resources.

It can be learned that, in this embodiment, it is possible for the terminal to transmit the same to-be-transmitted data for consecutively K times starting at a start time position of any one of the M consecutive resources.

Figure 4A:
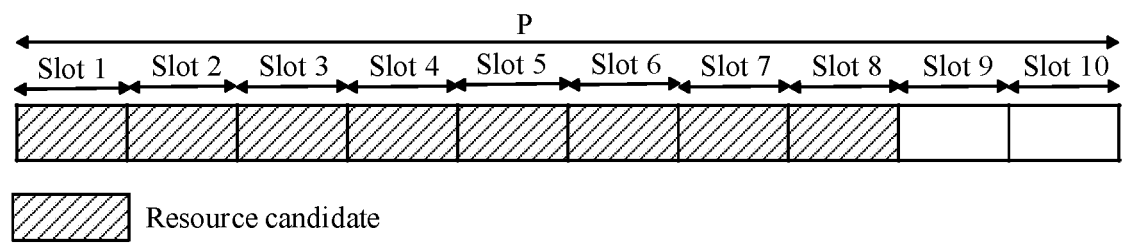
FIG. 4*a* is a first schematic diagram of a resource configuration period according to an embodiment of this disclosure.
Figure 4B:
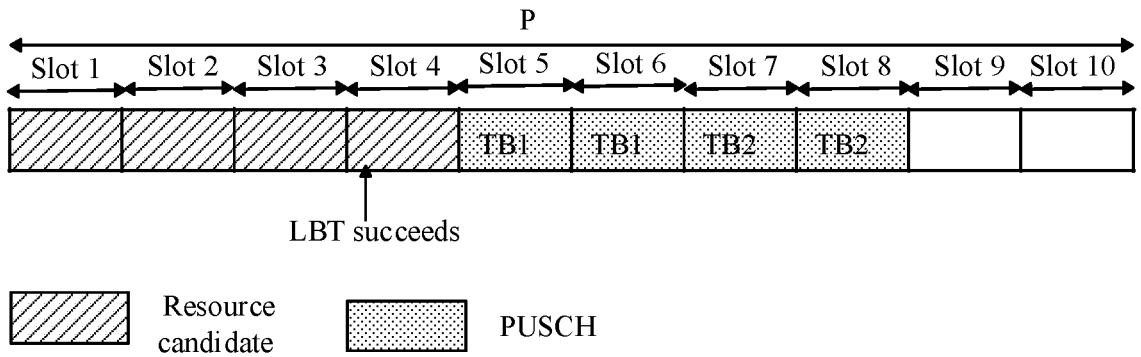
FIG. 4*b* is a first schematic diagram of transmission of to-be-transmitted data according to an embodiment of this disclosure.

For ease of understanding, refer to FIG. 4a and FIG. 4b. In FIG. 4a, P=10 slots, meaning that the resource configuration period includes 10 slots; K=2, meaning that the same to-be-transmitted data is transmitted consecutively twice; N=8, meaning that the first resource includes eight consecutive resources; a slot offset indicates starting from the first slot of P; and in SLIV, S=0 and L=14, meaning that a start time position of the first resource is the $0^{th}$ symbol, and a length of each resource is 14 symbols, namely, one slot. Therefore, it can be determined that slot 1 to slot 8 in FIG. 4a are all usable for configured grant transmission and regarded as resource candidates.

In this scenario, the target time positions include start time positions of all slots from slot 1 to slot 8.

As shown in FIG. 4b, if LBT succeeds in slot 4, it can be learned from FIG. 4b that a time position at which LBT succeeds is after a start time position of slot 4 and before a start time position of slot 5. Therefore, the terminal may transmit TB1 consecutively twice starting at the start time position of slot 5, complete the first transmission of TB1 in slot 5, and complete the second transmission of TB1 in slot 6.

Embodiment 2: In a case that the first resource is S resource groups, the target time positions include: a start time position of each resource group.

It should be understood that each resource group is each of the S resource groups.

It can be learned that, in this embodiment, it is possible for the terminal to transmit the same to-be-transmitted data for consecutively K times starting at a start time position of any one of the S resource groups.

Figure 5A:
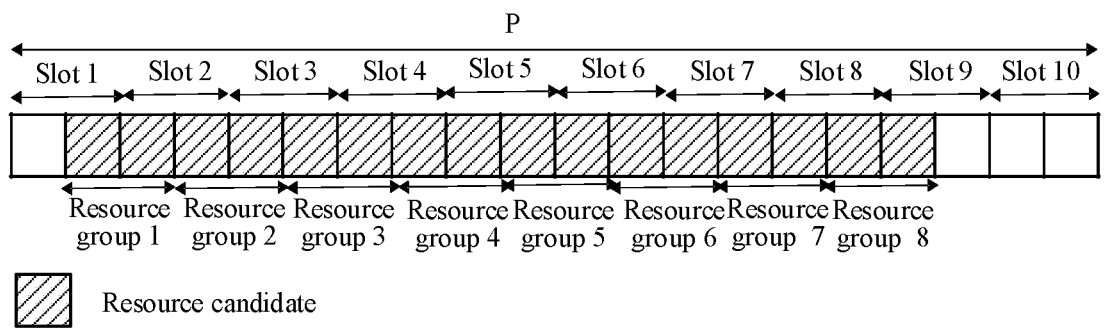
FIG. 5*a* is a second schematic diagram of a resource configuration period according to an embodiment of this disclosure.
Figure 5B:
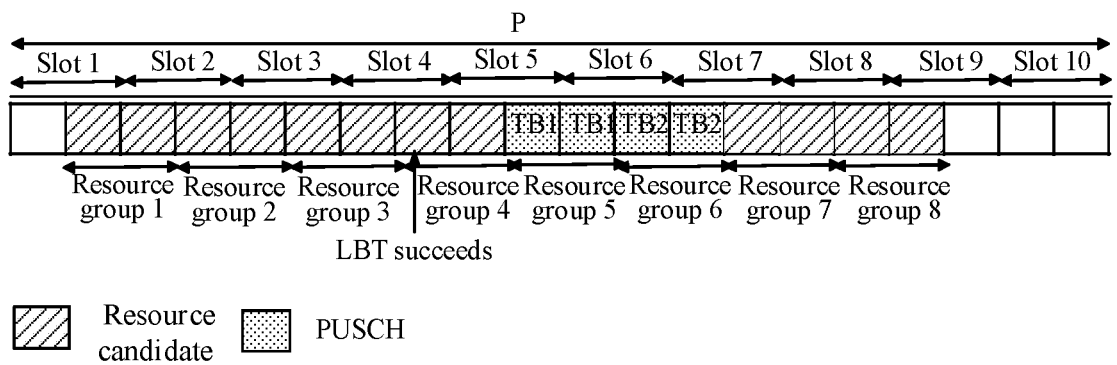
FIG. 5*b* is a second schematic diagram of transmission of to-be-transmitted data according to an embodiment of this disclosure.

For ease of understanding, refer to FIG. 5a and FIG. 5b. In FIG. 5a, P=10 slots, meaning that the resource configuration period includes 10 slots; K=2, meaning that the same to-be-transmitted data is transmitted consecutively twice; N=8, meaning that the first resource includes eight resource groups. It should be noted that, in FIG. 5a, the 8 resource groups are consecutive, but in other embodiments, the S consecutive resource groups may include at least two non-consecutive resource groups. A slot offset indicates that resources start from the first slot of P; and in SLIV, S=7 and L=7, meaning that a start time position of the first resource is the $7^{th}$ symbol in the $1^{st}$ slot, and a length of each resource is 7 symbols. It can be learned from the foregoing that in this embodiment, each resource group includes K resources. Therefore, in this scenario, each resource group includes 2 resources, and a length of each resource group is 14 symbols, namely, one slot. Therefore, it can be determined that resource group 1 to resource group 8 in FIG. 5a can all be used for configured grant transmission and regarded as resource candidates.

In this scenario, the target time positions include start time positions of all resource groups from resource group 1 to resource group 8.

As shown in FIG. 5b, if LBT succeeds in resource group 4, it can be learned from FIG. 5b that a time position at which LBT succeeds is after a start time position of resource group 4 and before a start time position of resource group 5. Therefore, the terminal may consecutively transmit TB1 twice starting at the start time position of resource group 5, complete the first transmission of TB1 in the first resource of resource group 5, and complete the second transmission of TB1 in the second resource of resource group 5. It can be learned that, in this embodiment of this disclosure, the to-be-transmitted data can be consecutively transmitted in one slot.

Embodiment 3: In a case that the first resource is Q resource groups, the target time positions include: a start time position of each resource group.

It should be understood that each resource group is each of the Q resource groups.

It can be learned that, in this embodiment, it is possible for the terminal to transmit the same to-be-transmitted data for consecutively K times starting at a start time position of any one of the Q resource groups.

Figure 6A:
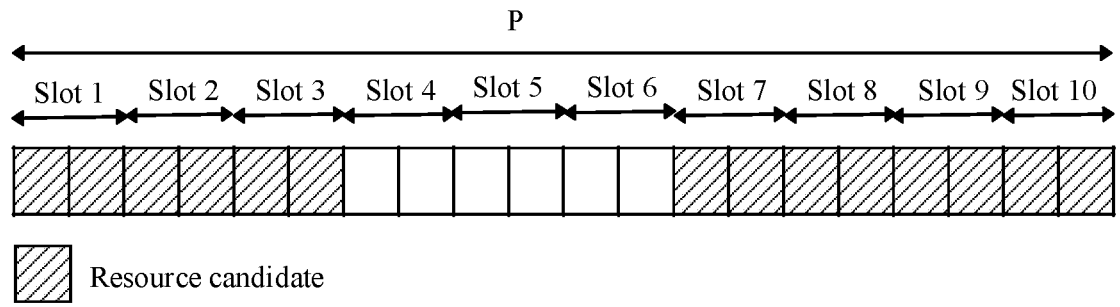
FIG. 6*a* is a third schematic diagram of a resource configuration period according to an embodiment of this disclosure.
Figure 6B:
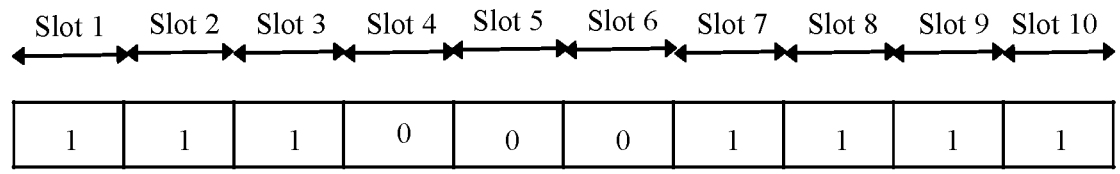
FIG. 6*b* is a second schematic diagram of a bitmap according to an embodiment of this disclosure.

For ease of understanding, refer to FIG. 6a and FIG. 6d. In FIG. 6a, P=10 slots, meaning that the resource configuration period includes 10 slots; K=2, meaning that the same to-be-transmitted data is transmitted consecutively twice; a slot offset indicates starting from the first slot of P; and in SLIV, S=0 and L=7, meaning that a start time position of the first resource is the $0^{th}$ symbol, and a length of each resource is 7 symbols. As shown in FIG. 6b, the bitmap is {1110001111}, and each bit indicates a slot. Therefore, in FIG. 6a, slot 1 to slot 3 and slot 7 to slot 10 are resource candidates.

Figure 6C:
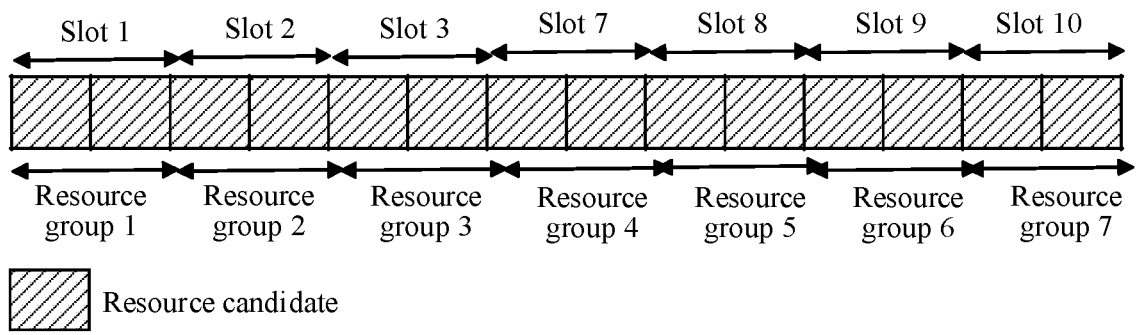
FIG. 6c is a second schematic diagram of virtual consecutive time-domain resources according to an embodiment of this disclosure.

The terminal may map slot 1 to slot 3 and slot 7 to slot 10 to the virtual consecutive time-domain resources as shown in FIG. 6c. Further, if K is 2, the terminal may divide, based on the virtual consecutive time-domain resources in FIG. 6c, slot 1 into resource group 1, slot 2 into resource group 2, slot 3 into resource group 3, slot 7 into resource group 4, slot 8 into resource group 5, slot 9 into resource group 6, and slot 10 into resource group 7. Therefore, the first resource includes resource group 1 to resource group 7.

In this scenario, the target time positions include start time positions of all resource groups from resource group 1 to resource group 7.

As shown in FIG. 6d, if LBT succeeds in resource group 2, it can be learned from FIG. 6d that a time position at which LBT succeeds is after a start time position of resource group 2 and before a start time position of resource group 3. Therefore, the terminal may transmit TB1 consecutively twice starting at the start time position of resource group 3, complete the first transmission of TB1 in the first resource of resource group 3, and complete the second transmission of TB1 in the second resource of resource group 3.

Embodiment 4: In a case that the first resource is T resource groups, the target time positions include: a start time position of each resource.

It should be understood that each resource is each of all resources included in the T resource groups.

It can be learned that, in this embodiment, it is possible for the terminal to transmit the same to-be-transmitted data for consecutively K times starting at a start time position of any one of all the resources included in the T resource groups.

For ease of understanding, refer to FIG. 6a, FIG. 6b, and FIG. 6e. In FIG. 6a, P=10 slots, meaning that the resource configuration period includes 10 slots; K=2, meaning that the same to-be-transmitted data is transmitted consecutively twice; a slot offset indicates starting from the first slot of P; and in SLIV, S=0 and L=7, meaning that a start time position of the first resource is the $0^{th}$ symbol, and a length of each resource is 7 symbols. As shown in FIG. 6b, the bitmap is {1110001111}, and each bit indicates a slot. Therefore, in FIG. 6a, slot 1 to slot 3 and slot 7 to slot 10 are resource candidates.

The terminal can divide slot 1 to slot 3 into resource group 1, and slot 7 to slot 10 into resource group 2. Therefore, the first resource includes resource group 1 and resource group 2.

In this scenario, the target time positions include start time positions of all resources included in resource group 1 and resource group 2.

As shown in FIG. 6e, if LBT succeeds in the first resource of slot 2, it can be learned from FIG. 6e that a time position at which LBT succeeds is after a start time position of the first resource of slot 2 and before a start time position of the second resource of slot 2. Therefore, the terminal may transmit TB1 consecutively twice starting at the start time position of the second resource of slot 2, complete the first transmission of TB1 in the second resource of slot 2, and complete the second transmission of TB1 in the first resource of slot 3.

In the transmission method of this embodiment of this application, the terminal device may determine a first resource usable for configured grant transmission within a configured grant resource period according to first indication information transmitted by the network-side device; and may transmit first to-be-transmitted data on the first resource for consecutively K times. In this way, flexibility of resource configuration can be improved.

Further, after LBT succeeds, the terminal device may transmit the to-be-transmitted data for consecutively K times starting at a target time position determined based on a time position at which LBT succeeds, so that reliability of the transmission of the to-be-transmitted data can be improved.

In this embodiment of this disclosure, in a case that the terminal further includes other to-be-transmitted data in addition to the first to-be-transmitted data, the terminal may transmit second to-be-transmitted data for consecutively K times after completing K transmissions of the first to-be-transmitted data. It should be understood that for the foregoing different embodiments, a time position at which the second to-be-transmitted data starts to be transmitted may be different, with specific descriptions as follows.

In the foregoing Embodiment 1, after the transmitting first to-be-transmitted data for consecutively K times starting at a second time position, the method further includes:

transmitting the second to-be-transmitted data for consecutively K times starting at a third time position in a case that the $K^{th}$ transmission of the first to-be-transmitted data is completed and there is a remaining resource in the first resource, where the third time position is an end time position of the $K^{th}$ transmission of the first to-be-transmitted data.

It should be understood that, for two consecutive resources, an end time position of a previous resource and a start time position of a next resource are the same time position.

For ease of understanding, refer to FIG. 4b again. In FIG. 4b, the terminal completes the second transmission of TB1 in slot 6, which can be understood that an end time position of the second transmission of TB1 is an end time position of slot 6. As shown in FIG. 4b, slot 6 and slot 7 are consecutive, and therefore the end time position of slot 6 is a start time position of slot 7.

Therefore, if the terminal has more than one TB to be transmitted, after completing K consecutive transmissions of the first to-be-transmitted data, the terminal may transmit TB2 consecutively twice starting at a start time position of slot 7, complete the first transmission of TB2 in slot 7, and complete the second transmission of TB2 in slot 8.

In the foregoing Embodiment 2, after the transmitting first to-be-transmitted data for consecutively K times starting at a second time position, the method further includes:

transmitting second to-be-transmitted data for consecutively K times starting at a target time position next to the second time position in a case that the $K^{th}$ transmission of the first to-be-transmitted data is completed and there is a remaining resource group in the first resource.

For ease of understanding, refer to FIG. 5b again. In FIG. 5b, the terminal completes the second transmission of TB1 in the second resource of resource group 5.

As shown in FIG. 5b, resource group 5 and resource group 6 are consecutive. Therefore, if the terminal has more than one TB to be transmitted, after completing K consecutive transmissions of the first to-be-transmitted data, the terminal may transmit TB2 consecutively twice starting at a start time position of resource group 6, complete the first transmission of TB2 in the first resource of resource group 6, and complete the second transmission of TB2 in the second resource of resource group 6.

For the foregoing Embodiment 3, there may be a case in which resources in at least two resource groups of a plurality of resource groups are non-consecutive in the bitmap. In this case, if the terminal wants to transmit to-be-transmitted data on a subsequent resource group or a resource group contiguous with a subsequent resource group, LBT needs to be performed again. In addition, a start time position of transmitting the to-be-transmitted data is associated with a time position at which LBT succeeds. Therefore, for the foregoing Embodiment 3, if the terminal has more than one TB to be transmitted, after the terminal completes K consecutive transmissions of TB1, a start transmission time position of TB2 needs to be discussed on a case-by-case basis depending on different decision results of whether the terminal still needs to perform LBT after completion of the $K^{th}$ transmission of TB1, with specific descriptions as follows.

For the foregoing Embodiment 3, after the transmitting first to-be-transmitted data for consecutively K times starting at the second time position in a case that the $K^{th}$ transmission of the first to-be-transmitted data is completed and there is a remaining resource group in the first resource, the method further includes:

if resources in the first resource group and resources in the second resource group are consecutive in the bitmap, transmitting the second to-be-transmitted resource for consecutively K times starting at a target time position next to the second time position; or if resources in the first resource group and resources in the second resource group are non-consecutive in the bitmap, performing LBT again; and if LBT succeeds after a fourth time position and before a fifth time position, or LBT succeeds at a fifth time position, transmitting the second to-be-transmitted data for consecutively K times starting at the fifth time position, where the first resource group is a resource group including the second time position; the second resource group is a resource group next to the first resource group; and the fourth time position and the fifth time position are two adjacent time positions in the target time positions.

In addition, it should be noted that, considering that the terminal may perform the LBT process on resources other than the resources usable for configured grant transmission, if the terminal device succeeds in LBT at a start time position of the second resource group, to be specific, before a next target time position of a second time position, or succeeds in LBT at a second time position, the terminal may transmit the second to-be-transmitted data for consecutively K times starting at the target time position next to the second time position.

For ease of understanding, refer to FIG. 6d again. In FIG. 6d, the terminal completes the first transmission of TB1 in the first resource of resource group 3, and completes the second transmission of TB1 in the second resource of resource group 3.

As shown in FIG. 6d, the next resource group of resource group 3 is resource group 4, and resources of resource group 3 and resources of resource group 4 are non-consecutive in the bitmap. Therefore, if the terminal has more than one TB to be transmitted, the terminal needs to perform LBT again after completing K consecutive transmissions of the first to-be-transmitted data. As shown in FIG. 6d, a time position at which LBT succeeds is after a start time position of resource group 4 and before a start time position of resource group 5. Therefore, the terminal may consecutively transmit TB2 twice starting at a start time position of resource group 5, complete the first transmission of TB2 in the first resource of resource group 5, and complete the second transmission of TB2 in the second resource of resource group 5.

For the foregoing Embodiment 4, there may be cases in which resources in at least two resources of a plurality of resource groups are non-consecutive in the bitmap. In this case, if the terminal wants to transmit to-be-transmitted data on a subsequent resource or a resource consecutive with the subsequent resource, LBT needs to be performed again. In addition, a start time position of transmitting the to-be-transmitted data is associated with a time position at which LBT succeeds. Therefore, for the foregoing Embodiment 4, if the terminal has more than one TB to be transmitted, after the terminal completes K consecutive transmissions of TB1, a start transmission time position of TB2 needs to be discussed on a case-by-case basis depending on different decision results of whether the terminal still needs to perform LBT after completion of the $K^{th}$ transmission of TB1, with specific descriptions as follows:

For the foregoing Embodiment 4, after the transmitting first to-be-transmitted data for consecutively K times starting at the second time position in a case that the $K^{th}$ transmission of the first to-be-transmitted data is completed and there is a remaining resource in the first resource, the method further includes:

if a second resource and a third resource are consecutive in the bitmap, transmitting second to-be-transmitted data for consecutively K times at a start time position of the third resource; or if a second resource and a third resource are non-consecutive in the bitmap, performing LBT again; and if LBT succeeds after a sixth time position and before a seventh time position, or LBT succeeds at a seventh time position, transmitting second to-be-transmitted data for consecutively K times starting at the seventh time position, where the second resource is a resource including an end time position of the $K^{th}$ transmission of the first to-be-transmitted data; the third resource is a next resource group of the second resource group; and the sixth time position and the seventh time position are two adjacent time positions in the target time positions.

In addition, it should be noted that, considering that the terminal may perform the LBT process on resources other than the resources usable for configured grant transmission, if the terminal device succeeds in LBT before a start time position of a third resource, or succeeds in LBT at a start time position of a third resource, the terminal may transmit the second to-be-transmitted data for consecutively K times starting at the start time position of the third resource.

For ease of understanding, refer to FIG. 6e again. In FIG. 6e, the terminal completes the first transmission of TB1 in the second resource of slot 2, and completes the second transmission of TB1 in the first resource of slot 3.

As shown in FIG. 6e, the first resource in slot 3 and the second resource in slot 3 are consecutive in the bitmap. Therefore, if the terminal has more than one TB to be transmitted, after completing K consecutive transmissions of the first to-be-transmitted data, as shown in FIG. 6e, the terminal may transmit TB1 consecutively twice directly starting at a start time position of the second resource in slot 3.

Specifically, the first transmission of TB2 is completed in the second resource of slot 3. As shown in FIG. 6e, because the second resource in slot 3 and the first resource in slot 7 are non-consecutive in the bitmap, the terminal needs to perform LBT again after completing the first transmission of TB2. As shown in FIG. 6e, if LBT succeeds at the first resource in slot 7, to be specific, LBT succeeds after a start time position of the first resource in slot 7 and before a start time of the second resource of slot 7, the second transmission of TB2 can be completed at the second resource in slot 7.

It should be noted that the foregoing descriptions only use an example in which the terminal has TB1 and TB2 to be transmitted. In practical application, the terminal may further transmit TB3, TB4, and the like after completing K transmissions of TB2. For a method of determining a start time position of K consecutive transmissions of TB3, TB4, and other to-be-transmitted data, reference may be made to the method for determining the start time position of the K consecutive transmissions of TB2. To avoid repetition, details are not described herein again.

In addition, in this embodiment of this disclosure, optionally, redundancy version RV fields corresponding to to-be-transmitted data in all transmissions are all set to be invalid and a same value, where the RV field is carried in uplink control information (UCI).

It should be understood that the RV fields corresponding to the same to-be-transmitted data in all transmissions may all be set to be invalid and a same value; and for different to-be-transmitted data, RV fields respectively corresponding to the to-be-transmitted data may be set to different values. For example, values of RV fields corresponding to the first to-be-transmitted data in all transmissions may be different from values of RV fields corresponding to the second to-be-transmitted data in all transmissions.

In this way, a base station can combine and decode UCI corresponding to the same to-be-transmitted data, which can improve a success ratio of UCI decoding.

It should be noted that various optional implementations described in this embodiment of this disclosure may be implemented in combination or may be implemented separately, which is not limited in this embodiment of this disclosure.

It can be learned from the foregoing that the transmission method of this embodiment of this disclosure can remap resources for K repetitions, and add a field N or use a bitmap to indirectly or directly indicate resources usable for configured grant transmission, so that time-domain resource configuration can be performed for configured grant UE in a 5G unlicensed spectrum. This can not only improve flexibility of resource configuration, but also retain transmission reliability of ultra-reliable and low-latency communications services in an unlicensed spectrum.

It can be known from the foregoing that the transmission method of this embodiment of this disclosure may at least include the following options:

Option 1:

P: a resource configuration period, a configuration period for which a configured grant in an NR licensed spectrum is reused; K: the number of repetitions, meaning that consecutive transmissions are performed on resources;

N: the number of resources, where configured resources are consecutive; and

SLIV: start time position S and length L of a first resource, which can be configured by using RRC or indicated by using DCI, and which need to ensure that each to-be-transmitted resource cannot span a slot boundary; where P, K, and N can all be configured by using RRC.

In the period P, a slot position is determined according to a slot offset configured by using RRC or indicated by the DCI, and N consecutive resources are configured at a start time position S in a slot indicated by SLIV, and a time granularity of each resource is L in SLIV. If UE succeeds in LBT cat 4 at a start boundary of a resource, the UE repeatedly transmits a PUSCH for consecutively K times starting at the resource. If the UE has more than one TB to be transmitted, after transmitting TB1 for K times, the UE transmits TB2 for K times.

Option 2:

P: a resource configuration period, a configuration period for which a configured grant in an NR licensed spectrum is reused;

K: the number of repetitions, meaning that consecutive transmissions are performed on resources;

N: the number of configured resource groups; and

SLIV: start time position S and length L of a first resource, which can be configured by using RRC or indicated by using DCI, and which need to ensure that each to-be-transmitted resource cannot span a slot boundary; where P, K, and N are all configured by using RRC.

In the period P, a slot position is determined according to a slot offset configured by using RRC or indicated by the DCI, and N resource groups are configured at a start time position S in a slot indicated by SLIV, each resource group includes K resources, and a time granularity of each resource is L in SLIV. If UE succeeds in LBT cat 4 at a start boundary of a resource, the UE repeatedly transmits a PUSCH for K times starting at the resource group. If the UE has more than one TB to be transmitted, after transmitting TB1 for K times at the first resource group, the UE transmits TB2 for K times at the second resource group.

Option 3:

P: a resource configuration period, a configuration period for which a configured grant in an NR licensed spectrum is reused;

K: the number of repetitions, meaning that consecutive transmissions are performed on resources;

SLIV: start time position S and length L of a first resource in a slot, which can be configured by using RRC or indicated by using DCI, and which need to ensure that each to-be-transmitted resource cannot span a slot boundary; and Bitmap: It indicates resources usable for configured grant in the period P, '1' represents a corresponding resource usable for configured grant transmission, and '0' represents a corresponding resource unusable for configured grant transmission. A resource granularity indicated by each bit may be configured by using RRC, and the number of bits in a bitmap may be configured by using RRC or set to a constant value.

P, K, and bitmap are all configured by using RRC.

A position of a slot is determined according to a slot offset configured by using RRC or indicated by using DCI, L indicated by SLIV is a time granularity of each scheduled resource, S is a starting time position of a configured grant resource in a slot, and usable configured grant resources in a period may be obtained based on a result indicated by the bitmap.

In a method, a usable configured grant resource candidate set is mapped to virtual consecutive time-domain resources. If UE succeeds in LBT cat 4 at a start boundary of a scheduled resource group, the UE repeatedly transmits a PUSCH for K times starting at the resource group. If the UE has more than one TB to be transmitted, after transmitting TB1 for K times, the UE transmits TB2 for K times.

In another method, usable configured grant resources are divided into several consecutive resource groups based on the result of the bitmap. If UE succeeds in LBT cat 4 at a start boundary of a scheduled resource, the UE repeatedly transmits a PUSCH for K times starting at the resource. If the UE has more than one TB to be transmitted, after transmitting TB1 for K times, the UE transmits TB2 for K times.

For the foregoing three methods, an RV version sequence is configured for K repetitions by using RRC. For example, when K=4, a sequence (0, 2, 3, 1) is configured, and each value in the sequence corresponds to an RV version of each of the K transmissions. In this embodiment of this disclosure, when the UE repeatedly transmits TB for K times, RV version fields in all UCI are all set to be invalid and a same value, so that the base station can combine and decode the UCI.

FIG. 7 is a second flowchart of a transmission method according to an embodiment of this disclosure. The transmission method shown in FIG. 7 may be applied to a network-side device.

As shown in FIG. 7, the transmission method includes the following steps:

Step 701: Transmit first indication information to a terminal device, where the first indication information is used to indicate a first resource usable for configured grant transmission within a configured grant resource period.

Optionally, the first indication information indicates the first resource in a field indication mode or a bitmap indication mode.

Optionally, in a case that the first indication information indicates the first resource in a field indication mode, the first resource is:

one resource; or

M consecutive resources, where M is an integer greater than 1; or

S resource groups, where each resource group includes K consecutive resources, and S is a positive integer.

Optionally, in a case that the first indication information indicates the first resource in a bitmap indication mode, the first resource is:

Q resource groups divided based on virtual time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

It should be noted that this embodiment serves as an implementation of the network-side device corresponding to the foregoing method embodiment in FIG. 2. Therefore, reference can be made to the related description in the method embodiment shown in FIG. 2, and the same beneficial effect can be achieved. To avoid repetition, details are not described herein again.

Figure 8:
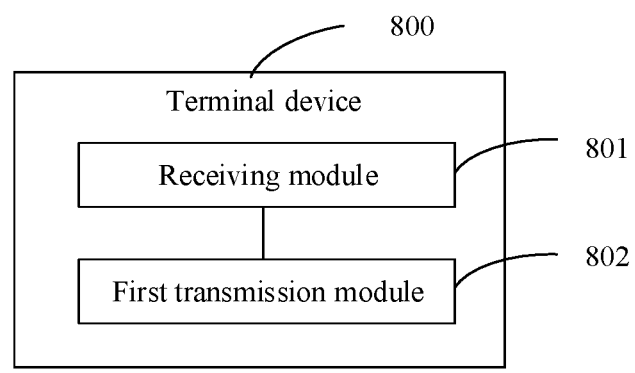
FIG. 8 is a first structural diagram of a terminal device according to an embodiment of this disclosure.

FIG. 8 is a first structural diagram of a terminal device according to an embodiment of this disclosure. As shown in FIG. 8, the terminal device 800 includes:

a receiving module 801, configured to receive first indication information from a network-side device, where the first indication information is used to indicate a first resource usable for configured grant transmission within a configured grant resource period; and a first transmission module 802, configured to transmit first to-be-transmitted data on the first resource for consecutively K times, where K is a positive integer.

Optionally, the first indication information indicates the first resource in a field indication mode or a bitmap indication mode.

Optionally, in a case that the first indication information indicates the first resource in a field indication mode, the first resource is:

one resource; or

M consecutive resources, where M is an integer greater than 1; or

S resource groups, where each resource group includes K consecutive resources, and S is a positive integer.

Optionally, in a case that the first indication information indicates the first resource in a bitmap indication mode, the first resource is:

Q resource groups divided based on virtual consecutive time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

Optionally, the first transmission module 801 is specifically configured to:

if the terminal device succeeds in listen before talk LBT after a first time position and before a second time position, or the terminal device succeeds in LBT at a second time position, transmit the first to-be-transmitted data for consecutively K times starting at a second time position; where the first time position and the second time position are two adjacent time positions in target time positions; and the target time positions are time positions that are determined based on the first resource and that are usable for starting transmitting the to-be-transmitted data for consecutively K times.

Optionally, in a case that the first resource is M consecutive resources, the target time positions include: a start time position of each resource.

Optionally, the terminal device 800 further includes:

a second transmission module, configured to transmit second to-be-transmitted data for consecutively K times starting at a third time position after transmitting the first to-be-transmitted data for consecutively K times starting at the second time position and in a case that the $K^{th}$ transmission of the first to-be-transmitted data is completed and there is a remaining resource in the first resource, where the third time position is an end time position of the $K^{th}$ transmission of the first to-be-transmitted data.

Optionally, in a case that the first resource is S consecutive resource groups, the target time positions include: a start time position of each resource group.

Optionally, the terminal device 800 further includes:

a third transmission module, configured to transmit second to-be-transmitted data for consecutively K times starting at a target time position next to the second time position after transmitting the first to-be-transmitted data for consecutively K times starting at the second time position and in a case that the $K^{th}$ transmission of the first to-be-transmitted data is completed and there is a remaining resource group in the first resource, where Optionally, in a case that the first resource is Q consecutive resource groups, the target time positions include: a start time position of each resource group.

Optionally, after the $K^{th}$ transmission of the first to-be-transmitted data is completed, and in a case that there is a remaining resource group in the first resource, the terminal device 800 further includes:

a fourth transmission module, configured to, after transmitting the first to-be-transmitted data for consecutively K times starting at the second time position, if resources in the first resource group and resources in the second resource group are consecutive in the bitmap, transmit the second to-be-transmitted resource for consecutively K times starting at a target time position next to the second time position; or if resources in the first resource group and resources in the second resource group are non-consecutive in the bitmap, perform LBT again; and if LBT succeeds after a fourth time position and before a fifth time position, or LBT succeeds at a fifth time position, transmit the second to-be-transmitted data for consecutively K times starting at the fifth time position, where the first resource group is a resource group including the second time position; the second resource group is a resource group next to the first resource group; and the fourth time position and the fifth time position are two adjacent time positions in the target time positions.

Optionally, in a case that the first resource is T consecutive resource groups, the target time positions include: a start time position of each resource.

Optionally, after the $K^{th}$ transmission of the first to-be-transmitted data is completed, and in a case that there is a remaining resource group in the first resource, the terminal device 800 further includes:

a fifth transmission module, configured to, after transmitting the first to-be-transmitted data for consecutively K times starting at the second time position, if a second resource and a third resource are consecutive in the bitmap, transmit the second to-be-transmitted resource for consecutively K times starting at a start time position of the third resource; or if a second resource and a third resource are non-consecutive in the bitmap, perform LBT again; and if LBT succeeds after a sixth time position and before a seventh time position, or LBT succeeds at a seventh time position, transmit second to-be-transmitted data for consecutively K times starting at the seventh time position, where the second resource is a resource including an end time position of the $K^{th}$ transmission of the first to-be-transmitted data; the third resource is a next resource group of the second resource group; and the sixth time position and the seventh time position are two adjacent time positions in the target time positions.

Optionally, redundancy version RV fields corresponding to to-be-transmitted data in all transmissions are all set to be invalid and a same value, where the RV field is carried in uplink control information UCI.

The terminal device 800 can implement the processes that can be implemented by the terminal device in the method embodiments of this disclosure, with the same beneficial effects achieved. To avoid repetition, details are not described herein again.

Figure 9:
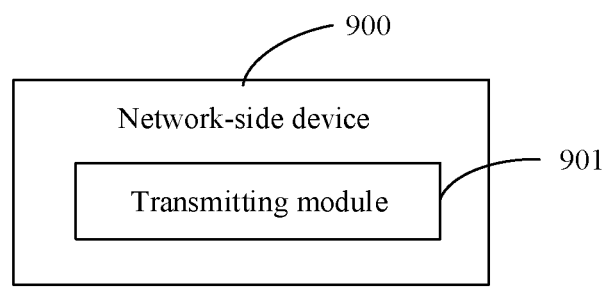
FIG. 9 is a first structural diagram of a network-side device according to an embodiment of this disclosure.

FIG. 9 is a first structural diagram of a network-side device according to an embodiment of this disclosure. As shown in FIG. 9, the network-side device 900 includes:

a transmitting module 901, configured to transmit first indication information to a terminal device, where the first indication information is used to indicate a first resource usable for configured grant transmission within a configured grant resource period.

Optionally, the first indication information indicates the first resource in a field indication mode or a bitmap indication mode.

Optionally, in a case that the first indication information indicates the first resource in a field indication mode, the first resource is:

one resource; or

M consecutive resources, where M is an integer greater than 1; or

S resource groups, where each resource group includes K consecutive resources, and S is a positive integer.

Optionally, in a case that the first indication information indicates the first resource in a bitmap indication mode, the first resource is:

Q resource groups divided based on virtual time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

The network-side device 900 can implement the processes that can be implemented by the network-side device in the method embodiments of this disclosure, with the same beneficial effects achieved. To avoid repetition, details are not described herein again.

Figure 10:
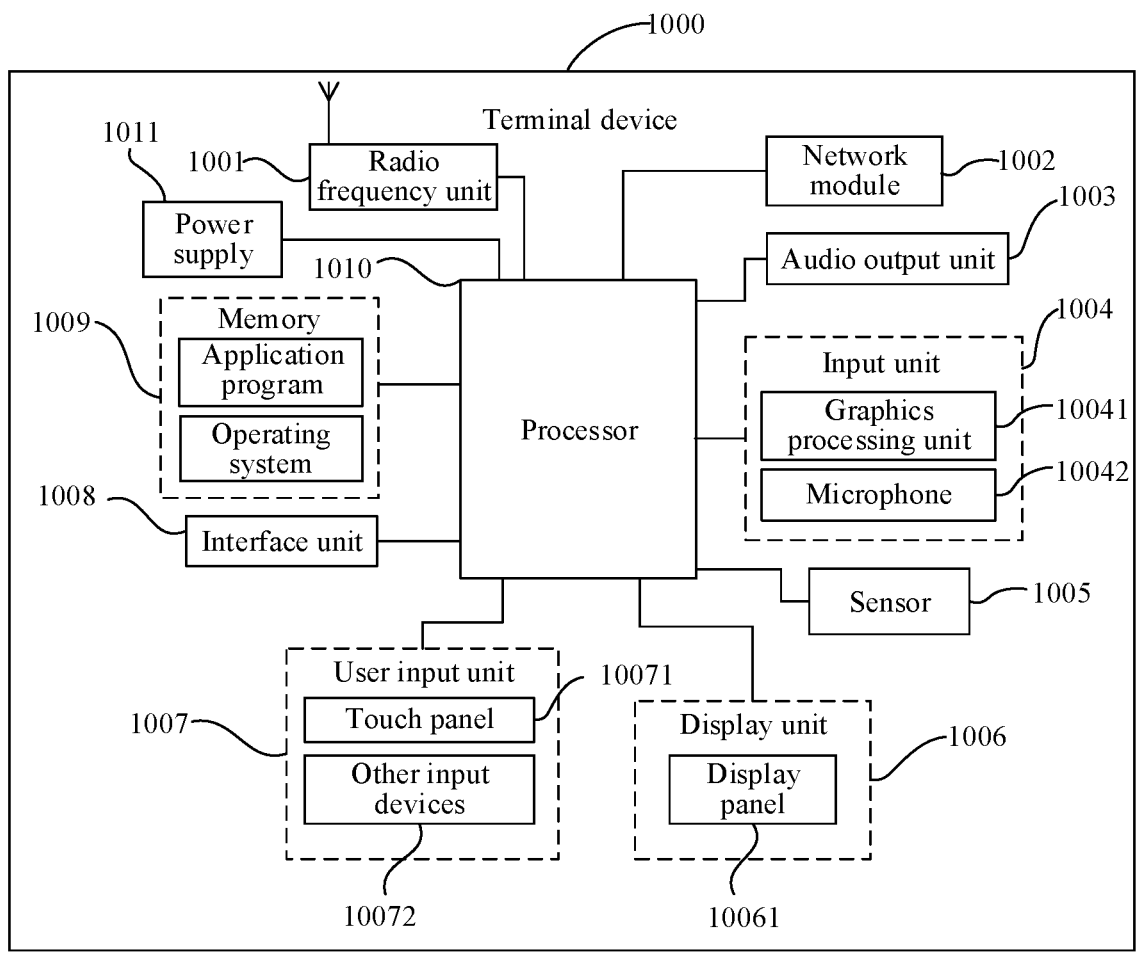
FIG. 10 is a second structural diagram of a terminal device according to an embodiment of this disclosure.

FIG. 10 is a second structural diagram of a terminal device according to an embodiment of this disclosure. The terminal device may be a schematic diagram of a hardware structure of a terminal device that implements the embodiments of this disclosure. As shown in FIG. 10, the terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the terminal device is not limited to the terminal device structure shown in FIG. 10. The terminal device may include more or fewer components than those shown in the figure, or combine some of the components, or arrange the components differently. In this embodiment of this disclosure, the terminal device includes but is not limited to a mobile phone, a tablet computer, a laptop computer, a palmtop computer, an in-vehicle terminal device, a wearable device, a pedometer, and the like.

The radio frequency unit 1001 is configured to:

receive first indication information from a network-side device, where the first indication information is used to indicate a first resource usable for configured grant transmission within a configured grant resource period; and transmit first to-be-transmitted data on the first resource for consecutively K times, where K is a positive integer.

Optionally, the first indication information indicates the first resource in a field indication mode or a bitmap indication mode.

Optionally, in a case that the first indication information indicates the first resource in a field indication mode, the first resource is:

one resource; or

M consecutive resources, where M is an integer greater than 1; or

S resource groups, where each resource group includes K consecutive resources, and S is a positive integer.

Optionally, in a case that the first indication information indicates the first resource in a bitmap indication mode, the first resource is:

Q resource groups divided based on virtual consecutive time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

Optionally, the radio frequency unit 1001 is further configured to:

if the terminal device succeeds in listen before talk LBT after a first time position and before a second time position, or the terminal device succeeds in LBT at a second time position, transmit the first to-be-transmitted data for consecutively K times starting at a second time position; where the first time position and the second time position are two adjacent time positions in target time positions; and the target time positions are time positions that are determined based on the first resource and that are usable for starting transmitting the to-be-transmitted data for consecutively K times.

Optionally, in a case that the first resource is M consecutive resources, the target time positions include: a start time position of each resource.

Optionally, the radio frequency unit 1001 is further configured to:

transmit the second to-be-transmitted data for consecutively K times starting at a third time position in a case that the $K^{th}$ transmission of the first to-be-transmitted data is completed and there is a remaining resource in the first resource, where the third time position is an end time position of the $K^{th}$ transmission of the first to-be-transmitted data.

Optionally, in a case that the first resource is S consecutive resource groups, the target time positions include: a start time position of each resource group.

Optionally, the radio frequency unit 1001 is further configured to:

transmit second to-be-transmitted data for consecutively K times starting at a target time position next to the second time position in a case that the $K^{th}$ transmission of the first to-be-transmitted data is completed and there is a remaining resource group in the first resource.

Optionally, in a case that the first resource is Q consecutive resource groups, the target time positions include: a start time position of each resource group.

Optionally, the radio frequency unit 1001 is further configured to:

if resources in the first resource group and resources in the second resource group are consecutive in the bitmap, transmit the second to-be-transmitted resource for consecutively K times starting at a target time position next to the second time position; or if resources in the first resource group and resources in the second resource group are non-consecutive in the bitmap, perform LBT again; and if LBT succeeds after a fourth time position and before a fifth time position, or LBT succeeds at a fifth time position, transmit the second to-be-transmitted data for consecutively K times starting at the fifth time position, where the first resource group is a resource group including the second time position; the second resource group is a resource group next to the first resource group; and the fourth time position and the fifth time position are two adjacent time positions in the target time positions.

Optionally, in a case that the first resource is T consecutive resource groups, the target time positions include: a start time position of each resource.

Optionally, the radio frequency unit 1001 is further configured to:

if a second resource and a third resource are consecutive in the bitmap, transmit second to-be-transmitted data for consecutively K times at a start time position of the third resource; or if a second resource and a third resource are non-consecutive in the bitmap, perform LBT again; and if LBT succeeds after a sixth time position and before a seventh time position, or LBT succeeds at a seventh time position, transmit second to-be-transmitted data for consecutively K times starting at the seventh time position, where the second resource is a resource including an end time position of the $K^{th}$ transmission of the first to-be-transmitted data; the third resource is a next resource group of the second resource group; and the sixth time position and the seventh time position are two adjacent time positions in the target time positions.

Optionally, redundancy version RV fields corresponding to to-be-transmitted data in all transmissions are all set to be invalid and a same value, where the RV field is carried in uplink control information UCI.

It should be noted that the foregoing terminal device 1000 in this embodiment is capable of implementing the processes that can be implemented by the terminal device in the method embodiments in the embodiments of this disclosure, with the same beneficial effects achieved. To avoid repetition, details are not described herein again.

It should be understood that, in this embodiment of this disclosure, the radio frequency unit 1001 may be configured to send or receive a signal in an information transmitting/receiving or call process. Specifically, the radio frequency unit 1001 receives downlink data from a base station and transmits the downlink data to the processor 1010 for processing; and transmits uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and other devices via a wireless communications system.

The terminal device provides wireless broadband Internet access for a user by using the network module 1002, for example, helps the user send and receive e-mails, browse web pages, and access streaming media.

The audio output unit 1003 may convert audio data received by the radio frequency unit 1001 or the network module 1002 or stored in the memory 1009 into an audio signal and output the audio signal as a sound. In addition, the audio output unit 1003 may further provide audio output (for example, a call signal received sound or a message received sound) that is related to a specific function performed by the terminal device 1000. The audio output unit 1003 includes a speaker, a buzzer, a receiver, and the like.

The input unit 1004 is configured to receive an audio or video signal. The input unit 1004 may include a graphics processing unit (GPU) 10041 and a microphone 10042, and the graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium) or transmitted by the radio frequency unit 1001 or the network module 1002. The microphone 10042 is capable of receiving sounds and processing such sounds into audio data. The processed audio data can be converted in a telephone call mode into a format that can be transmitted by the radio frequency unit 1001 to a mobile communication base station, for outputting.

The terminal device 1000 further includes at least one sensor 1005, for example, an optical sensor, a motion sensor, and other sensors. Specifically, the optical sensor includes an ambient light sensor and a proximity sensor. The ambient light sensor may adjust brightness of a display panel 10061 based on intensity of ambient light. When the terminal device 1000 moves near an ear, the proximity sensor may disable the display panel 10061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1006 is configured to display information input by the user or information provided to the user. The display unit 1006 may include the display panel 10061. The display panel 10061 may be configured in a form of a liquid crystal display (LCD), an organic light-emitting diode (OLED), or the like.

The user input unit 1007 may be configured to receive entered numerical or character information, and generate key signal input that is related to user setting and function control of the terminal device. Specifically, the user input unit 1007 includes a touch panel 10071 and other input devices 10072. The touch panel 10071, also referred to as a touchscreen, may capture a touch operation performed by a user on or near the touch panel 10071 (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 1010, and receives and executes a command transmitted by the processor 1010. In addition, the touch panel 10071 may be implemented in a plurality of forms, for example, as a resistive, capacitive, infrared, or surface acoustic wave touch panel. In addition to the touch panel 10071, the user input unit 1007 may further include other input devices 10072. Specifically, the other input devices 10072 may include but are not limited to a physical keyboard, a function key (for example, a volume control key or a power on/off key), a trackball, a mouse, and a joystick. Details are not described herein.

Further, the touch panel 10071 may cover the display panel 10061. When detecting a touch operation on or near the touch panel 10071, the touch panel 10071 transmits the touch operation to the processor 1010 for determining a type of the touch event. Then, the processor 1010 provides a corresponding visual output on the display panel 10061 based on the type of the touch event. In FIG. 10, the touch panel 10071 and the display panel 10061 serve as two separate components to implement input and output functions of the terminal device. However, in some embodiments, the touch panel 10071 and the display panel 10061 may be integrated to implement the input and output functions of the terminal device. This is not specifically limited herein.

The interface unit 1008 is an interface for connecting an external apparatus to the terminal device 1000. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 1008 may be configured to receive input (for example, data information and electric power) from the external apparatus, and transmit the received input to one or more elements in the terminal device 1000; or may be configured to transmit data between the terminal device 1000 and the external apparatus.

The memory 1009 may be configured to store software programs and various data. The memory 1009 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 1009 may include a high-speed random access memory, and may further include a non-volatile memory such as a disk storage device, a flash memory device, or other volatile solid-state storage devices.

The processor 1010 is a control center of the terminal device, uses various interfaces and lines to connect all parts of the entire terminal device, and performs various functions and data processing of the terminal device by running or executing the software program and/or module stored in the memory 1009 and invoking data stored in the memory 1009, thereby performing overall monitoring on the terminal device. The processor 1010 may include one or more processing units. Optionally, the processor 1010 may integrate an application processor and a modem processor. The application processor mainly processes an operating system, a user interface, an application program, and the like. The modem processor mainly processes wireless communication. It can be understood that the modem processor may alternatively be not integrated in the processor 1010.

The terminal device 1000 may further include a power supply 1011 (for example, a battery) that supplies power to each component. Optionally, the power supply 1011 may be logically connected to the processor 1010 by using a power management system, so as to implement functions such as charging management, discharging management, and power consumption management by using the power management system.

In addition, the terminal device 1000 includes some functional modules that are not illustrated. Details are not described herein.

Optionally, an embodiment of this disclosure further provides a terminal device, including a processor 1010, a memory 1009, and a computer program stored in the memory 1009 and capable of running on the processor 1010. When the computer program is executed by the processor 1010, the processes of the foregoing transmission method embodiments are implemented, with the same technical effects achieved. To avoid repetition, details are not described herein again.

Figure 11:
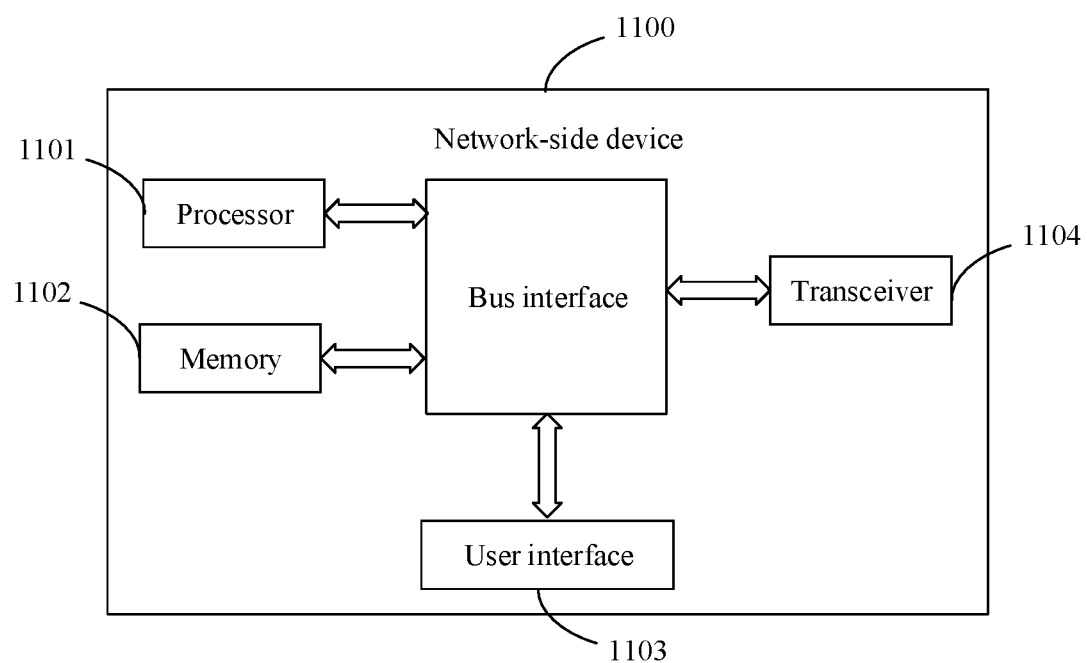
FIG. 11 is a second structural diagram of a network-side device according to an embodiment of this disclosure.

FIG. 11 is a second structural diagram of a network-side device according to an embodiment of this disclosure. As shown in FIG. 11, a network-side device 1100 includes a processor 1101, a memory 1102, a user interface 1103, a transceiver 1104, and a bus interface.

In this embodiment of this disclosure, the network-side device 1100 further includes a computer program stored in the memory 1102 and capable of running on the processor 1101. When the computer program is executed by the processor 1101, the following step is implemented:

transmitting first indication information to a terminal device, where the first indication information is used to indicate a first resource usable for configured grant transmission within a configured grant resource period.

Optionally, the first indication information indicates the first resource in a field indication mode or a bitmap indication mode.

Optionally, in a case that the first indication information indicates the first resource in a field indication mode, the first resource is:

one resource; or

M consecutive resources, where M is an integer greater than 1; or

S resource groups, where each resource group includes K consecutive resources, and S is a positive integer.

Optionally, in a case that the first indication information indicates the first resource in a bitmap indication mode, the first resource is:

Q resource groups divided based on virtual time-domain resources, where each resource group includes K virtual consecutive resources, the virtual time-domain resources are obtained by mapping resources usable for configured grant transmission as indicated by a bitmap, and Q is a positive integer; or T resource groups, where each resource group is determined by resources usable for configured grant transmission as indicated by a bitmap, resources in different resource groups are non-consecutive in the bitmap, and T is a positive integer.

In FIG. 11, a bus architecture may include any quantity of interconnected buses and bridges, and specifically connect together various circuits of one or more processors represented by the processor 1101 and a memory represented by the memory 1102. The bus architecture may further interconnect various other circuits such as a peripheral device, a voltage regulator, and a power management circuit. These are all common sense in the art, and therefore are not further described in this specification. The bus interface provides interfaces. The transceiver 1104 may be a plurality of components, including a transmitter and a receiver, and provides units for communicating with a variety of other apparatuses on a transmission medium. For different user equipments, the user interface 1103 may also be an interface capable of externally or internally connecting a required device, and the connected device includes but is not limited to a keypad, a display, a speaker, a microphone, a joystick, and the like.

The processor 1101 is responsible for management of the bus architecture and general processing, and the memory 1102 may store data for use by the processor 1101 when the processor 1101 performs an operation.

The network-side device 1100 is capable of implementing the processes implemented by the network-side device in the foregoing method embodiments. To avoid repetition, details are not described herein again.

An embodiment of this disclosure further provides a computer-readable storage medium, where a computer program is stored in the computer-readable storage medium. When the computer program is executed by a processor, processes of the foregoing transmission method embodiment can be implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the method described in the embodiments of this disclosure.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art may be implemented in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. For hardware implementation, the module, unit, and subunit may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, persons of ordinary skill in the art may develop many other forms without departing from the principle of this disclosure and the protection scope of the claims, and all such forms fall within the protection scope of this disclosure.

What is claimed is:

1. A transmission method, applied to a terminal device and comprising:
   receiving first indication information from a network-side device, wherein the first indication information is used to indicate a first resource usable for configured grant transmission within a configured grant resource period; and
   transmitting first to-be-transmitted data on the first resource for consecutively K times, wherein K is a positive integer;
   wherein the first resource is determined based on a slot offset and a quantity of consecutive slots, both the slot offset and the quantity of consecutive slots being indicated by the first indication information.

2. The method according to claim 1, wherein the first indication information indicates the first resource in a field indication.

3. The method according to claim 2, wherein in a case that the first indication information indicates the first resource in a field indication mode, the first resource is:
   one resource; or
   M consecutive resources, wherein M is an integer greater than 1; or
   S resource groups, wherein each resource group comprises K consecutive resources, and S is a positive integer.

4. The method according to claim 1, wherein the transmitting first to-be-transmitted data on the first resource for consecutively K times comprises:
   if the terminal device succeeds in listen before talk (LBT) after a first time position and before a second time position, or the terminal device succeeds in LBT at a second time position, transmitting the first to-be-transmitted data for consecutively K times starting at the second time position; wherein
   the first time position and the second time position are two adjacent time positions in target time positions; and the target time positions are time positions that are determined based on the first resource and that are usable for starting transmitting the to-be-transmitted data for consecutively K times.

5. The method according to claim 4, wherein in a case that the first resource is M consecutive resources, the target time positions comprise: a start time position of each resource;
wherein after the transmitting the first to-be-transmitted data for consecutively K times starting at the second time position, the method further comprises:
transmitting the second to-be-transmitted data for consecutively K times starting at a third time position in a case that the Kth transmission of the first to-be-transmitted data is completed and there is a remaining resource in the first resource, wherein
the third time position is an end time position of the Kth transmission of the first to-be-transmitted data.

6. The method according to claim 4, wherein in a case that the first resource is S resource groups, the target time positions comprise: a start time position of each resource group;
wherein after the transmitting the first to-be-transmitted data for consecutively K times starting at the second time position, the method further comprises:
transmitting second to-be-transmitted data for consecutively K times starting at a target time position next to the second time position in a case that the Kth transmission of the first to-be-transmitted data is completed and there is a remaining resource group in the first resource.

7. The method according to claim 4, wherein in a case that the first resource is Q resource groups, the target time positions comprise: a start time position of each resource group;
wherein after the transmitting the first to-be-transmitted data for consecutively K times starting at the second time position in a case that the Kth transmission of the first to-be-transmitted data is completed and there is a remaining resource group in the first resource, the method further comprises:
if resources in the first resource group and resources in the second resource group are consecutive in the bitmap, transmitting the second to-be-transmitted resource for consecutively K times starting at a target time position next to the second time position; or
if resources in the first resource group and resources in the second resource group are non-consecutive in the bitmap, performing LBT again; and if LBT succeeds after a fourth time position and before a fifth time position, or LBT succeeds at a fifth time position, transmitting the second to-be-transmitted data for consecutively K times starting at the fifth time position, wherein
the first resource group is a resource group comprising the second time position; the second resource group is a resource group next to the first resource group; and the fourth time position and the fifth time position are two adjacent time positions in the target time positions.

8. The method according to claim 4, wherein in a case that the first resource is T resource groups, the target time positions comprise: a start time position of each resource;
wherein after the transmitting first to-be-transmitted data for consecutively K times starting at the second time position in a case that the Kth transmission of the first to-be-transmitted data is completed and there is a remaining resource group in the first resource, the method further comprises:
if a second resource and a third resource are consecutive in the bitmap, transmitting second to-be-transmitted data for consecutively K times at a start time position of the third resource; or
if a second resource and a third resource are non-consecutive in the bitmap, performing LBT again; and if LBT succeeds after a sixth time position and before a seventh time position, or LBT succeeds at a seventh time position, transmitting second to-be-transmitted data for consecutively K times starting at the seventh time position, wherein
the second resource is a resource comprising an end time position of the Kth transmission of the first to-be-transmitted data; the third resource is a next resource group of the second resource group; and the sixth time position and the seventh time position are two adjacent time positions in the target time positions.

9. The method according to claim 1, wherein redundancy version (RV) fields corresponding to to-be-transmitted data in all transmissions are all set to be invalid and a same value, wherein
the RV field is carried in uplink control information (UCI).

10. A non-transitory computer-readable storage medium, wherein the non-transitory computer-readable storage medium stores a computer program, and when the computer program is executed by a processor, the steps of the transmission method according to claim 1 are implemented.

11. A transmission method, applied to a network-side device and comprising:
transmitting first indication information to a terminal device, wherein the first indication information is used to indicate a first resource usable for configured grant transmission within a configured grant resource period;
wherein the first resource is determined based on a slot offset and a quantity of consecutive slots, both the slot offset and the quantity of consecutive slots being indicated by the first indication information.

12. The method according to claim 11, wherein the first indication information indicates the first resource in a field indication mode.

13. The method according to claim 12, wherein in a case that the first indication information indicates the first resource in a field indication mode, the first resource is:
one resource; or
M consecutive resources, wherein M is an integer greater than 1; or
S resource groups, wherein each resource group comprises K consecutive resources, and S is a positive integer.

14. A network-side device, comprising a processor, a memory, and a computer program stored in the memory and capable of running on the processor, wherein when the computer program is executed by the processor, the steps of the transmission method according to claim 11 are implemented.

15. The network-side device according to claim 14, wherein the first indication information indicates the first resource in a field indication mode.

16. A non-transitory computer-readable storage medium, wherein the non-transitory computer-readable storage medium stores a computer program, and when the computer program is executed by a processor, the steps of the transmission method according to claim 11 are implemented.

17. A terminal device, comprising a processor, a memory, and a computer program stored in the memory and capable of running on the processor, wherein when the computer program is executed by the processor, a transmission method is implemented, and the method comprises:
receiving first indication information from a network-side device, wherein the first indication information is used to indicate a first resource usable for configured grant transmission within a configured grant resource period; and transmitting first to-be-transmitted data on the first resource for consecutively K times, wherein K is a positive integer;

wherein the first resource is determined based on a slot offset and a quantity of consecutive slots, both the slot offset and the quantity of consecutive slots being indicated by the first indication information.

18. The terminal device according to claim 17, wherein the first indication information indicates the first resource in a field indication mode.

* * * * *